US007021599B2

(12) United States Patent
DeGrazia et al.

(10) Patent No.: US 7,021,599 B2
(45) Date of Patent: Apr. 4, 2006

(54) UNIVERSAL MOTOR BRACKET FOR MOTOR OPERATORS

(75) Inventors: Dean Basil DeGrazia, Pittsburgh, PA (US); Erik Russell Bogdon, Carnegie, PA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/839,856

(22) Filed: May 6, 2004

(65) Prior Publication Data

US 2004/0232308 A1 Nov. 25, 2004

Related U.S. Application Data

(63) Continuation of application No. 10/141,038, filed on May 8, 2002, now abandoned.

(51) Int. Cl.
*F16M 1/00* (2006.01)

(52) U.S. Cl. ..................... 248/645; 248/674; 248/678; 248/911; 310/91

(58) Field of Classification Search ............... 248/674, 248/645, 558, 207, 676, 680, 911, 912, 678; 310/91, 89
See application file for complete search history.

(56) References Cited

U.S. PATENT DOCUMENTS

| | | | | |
|---|---|---|---|---|
| 4,601,378 | A * | 7/1986 | Pierce et al. | 192/115 |
| 6,533,238 | B1 * | 3/2003 | Barnes et al. | 248/680 |

* cited by examiner

*Primary Examiner*—Korie Chan
(74) *Attorney, Agent, or Firm*—Martin J. Moran

(57) ABSTRACT

A mounting bracket for the motor within a motor operator for a circuit breaker may be secured within the motor operator's housing a first orientation, thereby permitting it to support a first type of motor. Placing the mounting bracket within the housing in a second orientation permits the mounting bracket to accommodate a second type of motor.

12 Claims, 9 Drawing Sheets

UNIVERSAL MOTOR BRACKET FOR MOTOR OPERATORS

This is a continuation of Application No. 10/141,038, filed May 8, 2002 now abandoned.

BACKGROUND OF THE INVENTION

1. Field of the Invention

The present invention relates to motor operators for circuit breakers. More specifically, the present invention provides a mounting bracket for the motor of a motor operator, adapted to permit use of the mounting bracket with different motors by merely changing the orientation of the mounting bracket within the motor operator housing.

2. Description of the Related Art

Circuit breakers are frequently actuated remotely, by securing a motor operator over the face of the circuit breaker, so that the motor operator can actuate the circuit breaker. A typical motor operator includes an electric motor, operatively connected through a system of gears to a threaded rod. A sliding actuator is threadedly connected to the threaded rod, so that rotation of the threaded rod causes the sliding actuator to reciprocate back and forth. The sliding actuator fits over the circuit breaker's operating handle, so that movement of the actuator moves the operating handle. A kill/toggle switch at each end of the sliding actuator's range of travel shuts off the current, and reverses the direction of current that will be supplied to the motor, upon being depressed by the sliding actuator. A printed circuit board will typically contain the motor operator's control circuitry.

When the user transmits a signal to close the circuit breaker, the control circuitry will supply current to the motor, thereby rotating the threaded shaft to slide the sliding actuator from one end of its range of travel to the other, thereby moving the circuit breaker's operating handle, and closing the circuit breaker. Upon reaching the end of its range of travel wherein the circuit breaker is closed, the sliding actuator hits the toggle switch at that location, thereby shutting off current to the motor, and reversing the direction of current to the motor. When the user transmits a signal to open the circuit breaker, the control circuit will again supply current to the motor, thereby moving the sliding actuator to the opposite end of its range of travel, moving the circuit breaker's operating handle to its open position. As before, when the sliding actuator reaches the position wherein the circuit breaker is open, it strikes a kill/toggle switch, shutting off current to the motor, and reversing the direction of current flow to the motor.

Depending on the specific application for which the motor operator will be used, a different size or type of motor may be selected. To reduce the costs associated with maintaining component inventories, and assembling the motor operators, it is desirable that as many other components as possible remain the same even if a different sized motor is used. Accordingly, there is a need for amounting bracket for motors within a motor operator capable of being used to secure more than one type of motor within the motor operator.

SUMMARY OF THE INVENTION

The present invention provides a mounting bracket for supporting the motor within a motor operator, capable of being used with two different motors by merely switching the orientation of the mounting bracket.

The mounting bracket of the present invention includes a pair of flanges joined together at a substantially perpendicular angle to each other. Each flange of the bracket includes a motor aperture, at least one motor screw aperture, and at least one mounting screw hole. More preferably, the mounting bracket includes a pair of motor screw apertures on each side of the motor aperture, and a pair of mounting screw holes. Each flange also includes an outside face, facing away from the opposing flange, and an inside face, facing towards the opposing flange. The outside face of each flange includes at least one, and preferably at least a pair, of locating pegs, dimensioned and configured to fit within apertures within the floor of the motor operator's housing. The mounting bracket will preferably have a difference in height between the motor aperture within its first flange and the motor aperture within its second flange. Preferred embodiments will also include a different shape and location of locator peg on the outside face of each flange.

To mount a first size motor within the motor operator housing, the locator pegs on the second flange are inserted into the housing floor, so that the first flange will support the motor. Likewise, to install second type of motor within the motor operator housing, the locator pegs on the first flange are inserted into the corresponding apertures within the bottom of the housing, so that the second flange of the bracket is supporting the motor. The motor is then secured within the bracket, and the bracket is secured within the housing.

BRIEF DESCRIPTION OF THE DRAWINGS

Like reference numbers denote like elements throughout the drawings.

DETAILED DESCRIPTION

Figure 1:
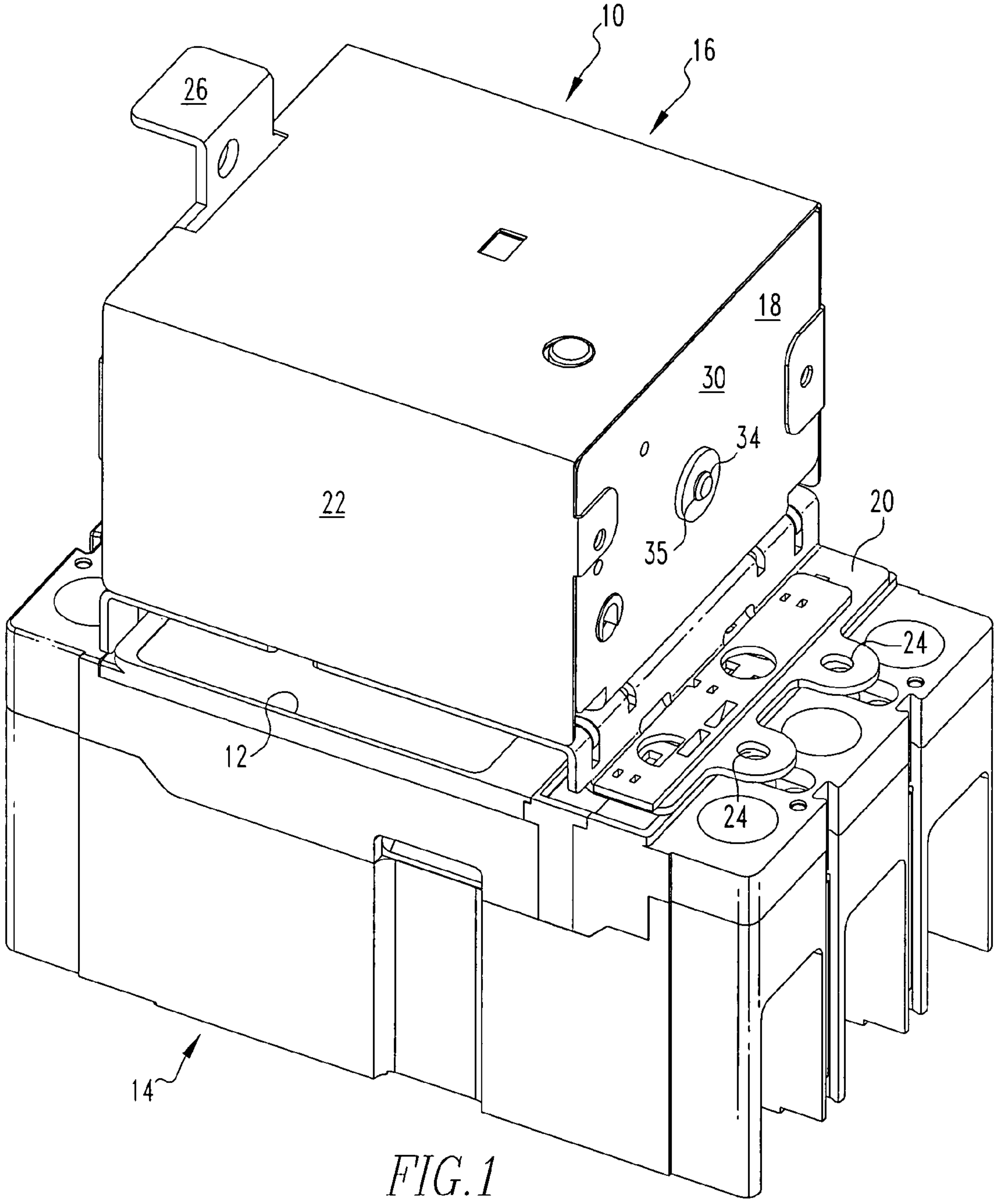
FIG. 1 is a top isometric view of a circuit breaker with its associated motor operator.

The present invention provides a mounting bracket for the motor within a motor operator for a circuit breaker, which may be used to mount either of two alternative motors within the motor operator by merely switching the orientation of the mounting bracket.

FIGS. 1–4 illustrate a motor operator 10 mounted on the face 12 of a circuit breaker 14. The motor operator 10 includes a housing 16 having a base 18, mounting bracket 20, and cover 22. The base 18 is hingedly secured to the mounting bracket 20, which is in turn secured to the face 12 of the circuit breaker 14 by means well known in the art of circuit breakers, for example, screws passing through the apertures 24. The base 18 also includes a lifting tab 26, for lifting the hingedly secured base 18 away from the mounting bracket 20 to provide manual control of the circuit breaker 14. The housing 16 of the motor operator 10 also includes a cover 22, which, in conjunction with the base 18, fully encloses the motor operator 10.

Figure 2:
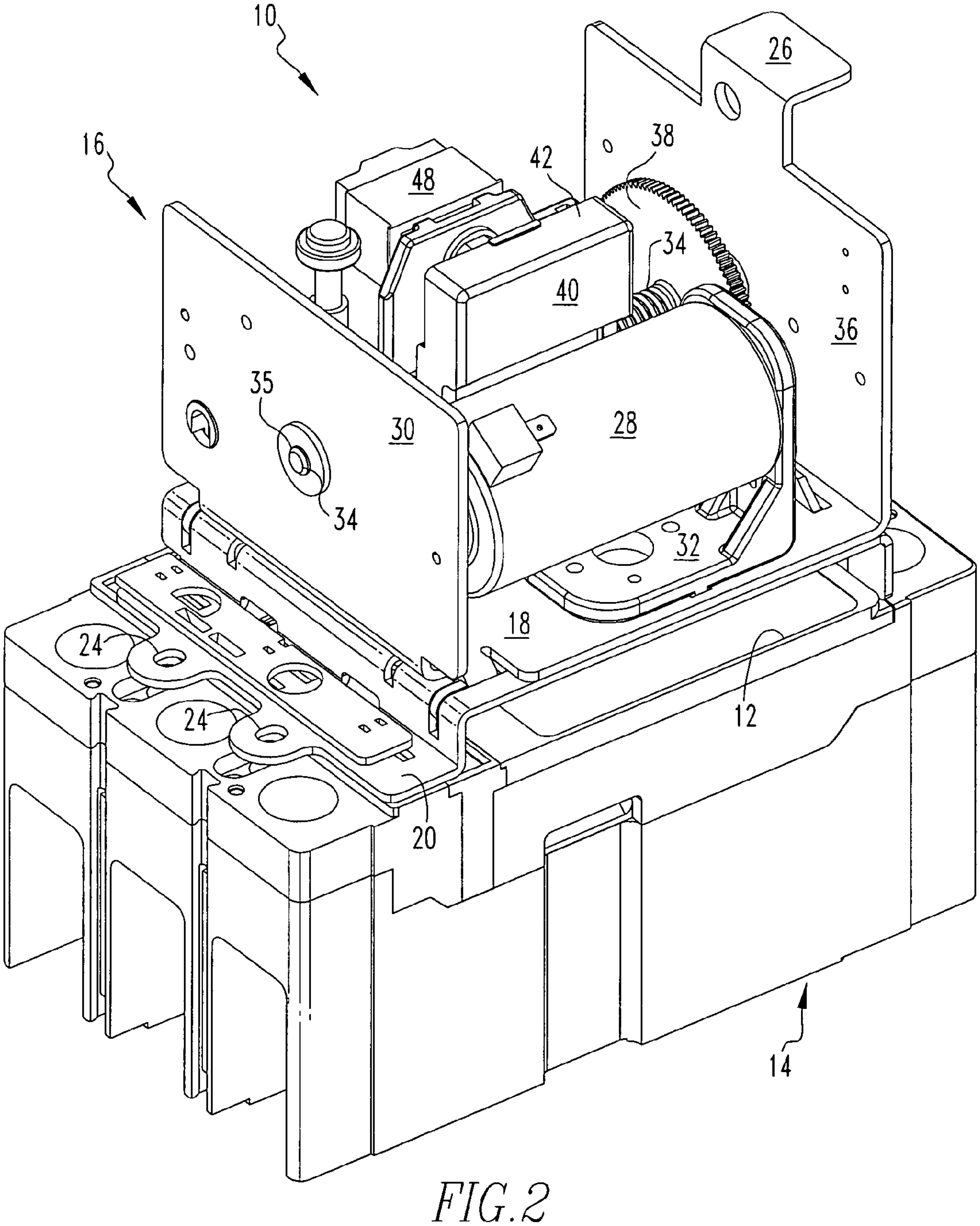
FIG. 2 is a top isometric view of a circuit breaker and its associated motor operator, with the cover of the motor operator removed.
Figure 3:
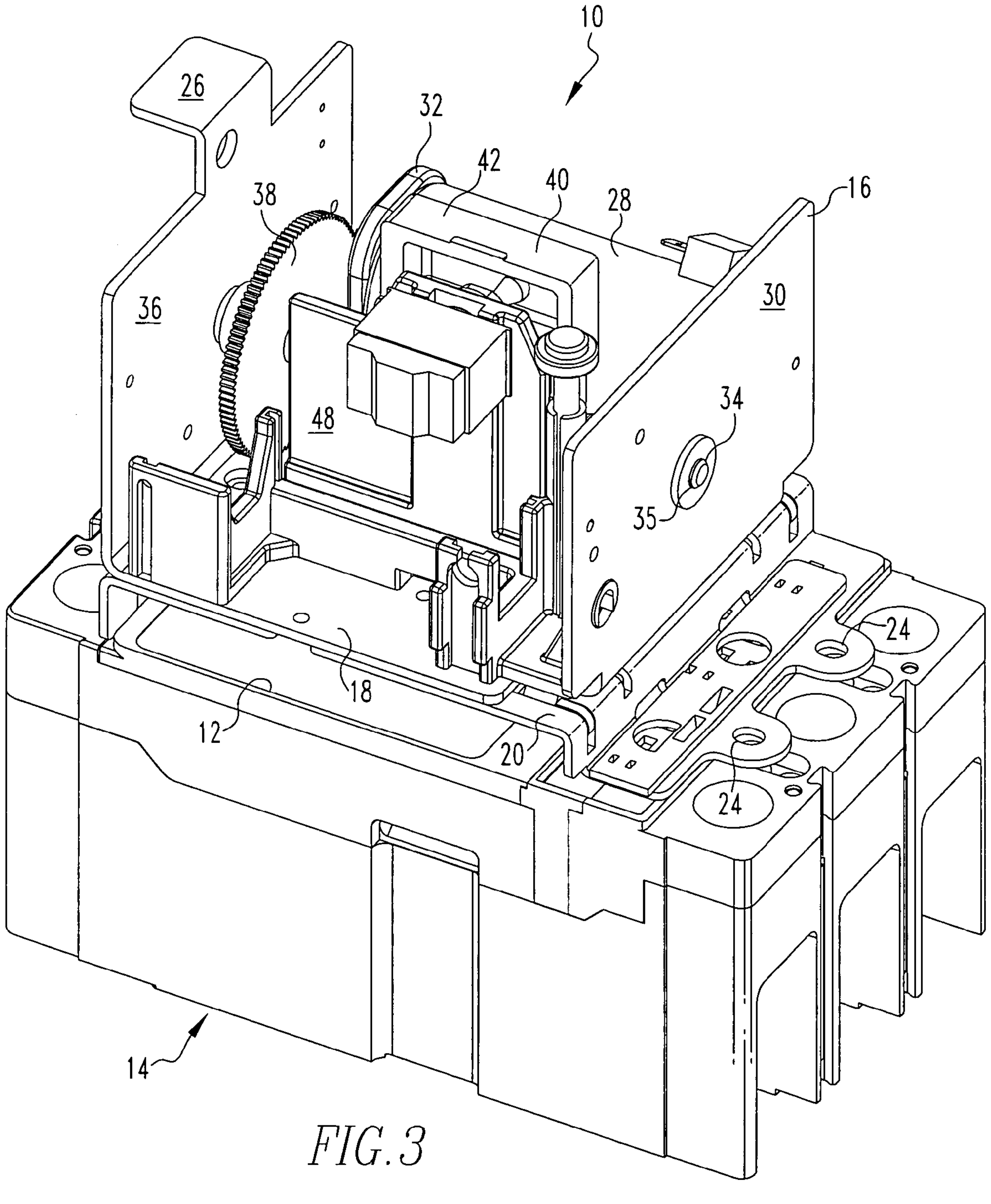
FIG. 3 is a top isometric view of a circuit breaker and motor operator, with the cover of the motor operator removed
Figure 4:
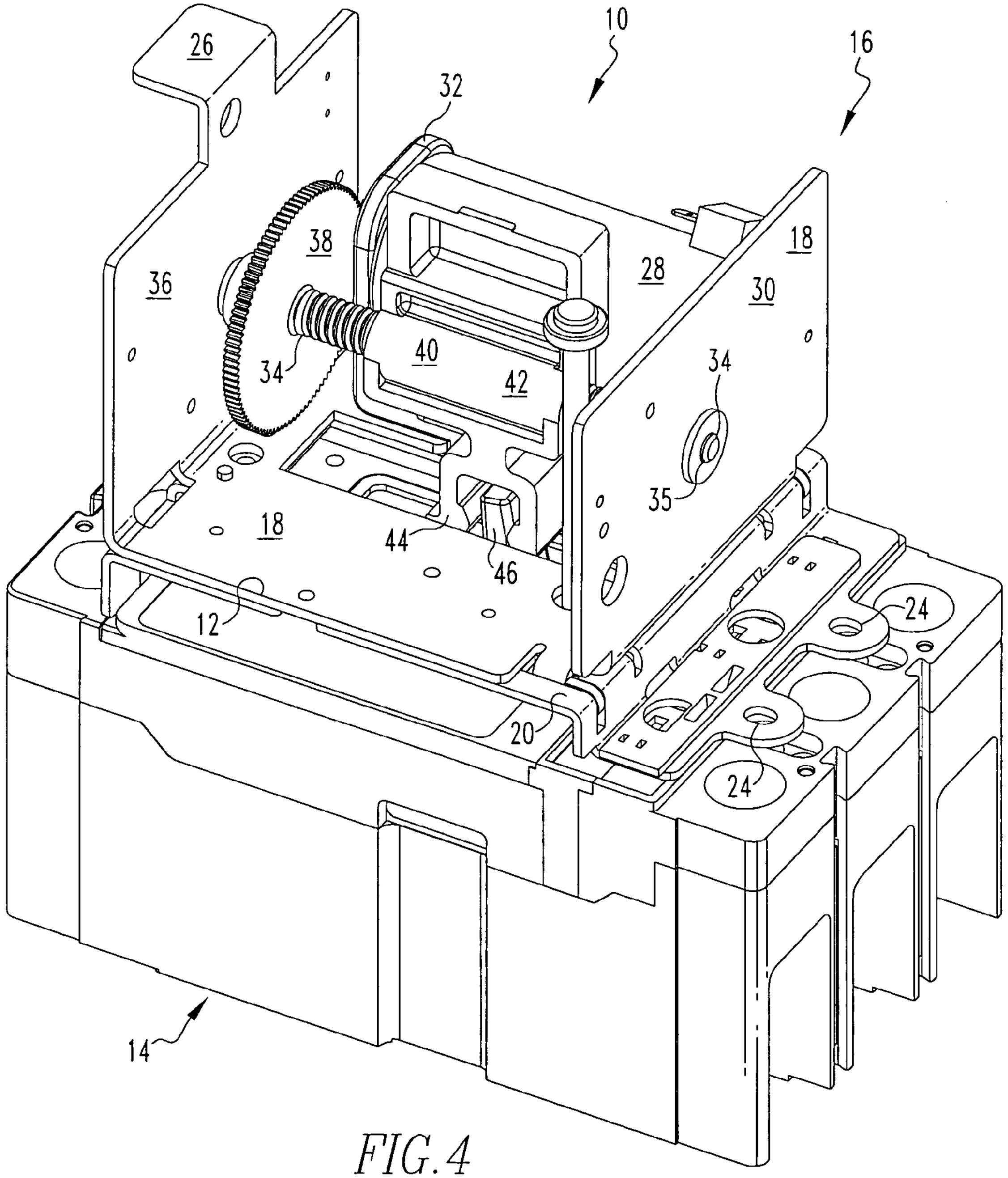
FIG. 4 is a top isometric view of a circuit breaker and motor operator, with the cover and printed circuit board of the motor operator removed

Referring to FIGS. 2–4, the motor operator 10 includes a motor 28, which in the present example is an electrical motor 28 secured between one wall 30 of the base 18 and the motor bracket 32. A screw shaft 34 extends between the wall 30 and wall 36 of the base 18, being rotatably secured within the apertures 35 therein at either end. Gear 38 is located at one end of the screw shaft 34, with the gear 38 operatively engaging a corresponding gear that is driven by the motor 28, so that the screw shaft 34 is thereby driven by the motor 32. A sliding actuator 40 includes an upper portion 42 that is threadedly connected to the screw shaft 34, and a lower portion 44 that engages the operating handle 46 of the circuit breaker 14. A kill/toggle switch is located at either end of the range of travel of the sliding actuator 40. The kill/toggle switches, which are not shown but are well known in the art, when actuated by the sliding actuator 40, will simultaneously shut off current to the motor 28, and reverse the direction of current through the motor 28. The flow of current through the motor 28 is further controlled through the printed circuit board 48, and its associated signal processing circuitry (well known in the art).

The motor operator 10 will typically be used to remotely control the operation of the circuit breaker 14. When the user transmits a signal to close the circuit breaker 14, the control circuitry within the PC board 48 will supply current to the motor 28, thereby rotating the screw shaft 34 to move the sliding actuator 40 from one end of its range of travel to the other, thereby moving the circuit breaker's operating handle 46, and closing the circuit breaker 14. Upon reaching the end of its range of travel wherein the circuit breaker 14 is closed, the sliding actuator 40 hits the kill/toggle switch at that location, thereby shutting off current to the motor 28, and reversing the direction of current to the motor 28. When the user opens the circuit breaker 14, the control circuit within the PC board 48 will again supply current to the motor 28, thereby moving the sliding actuator 40 to the opposite end of its range of travel along the screw shaft 34, moving the circuit breaker's operating handle 46 to the open position. As before, when a sliding actuator 40 reaches the position wherein the circuit breaker is open, it strikes a kill/toggle switch, shutting off current to the motor 28, and also reversing the direction of current flow to the motor 28.

Figure 5:
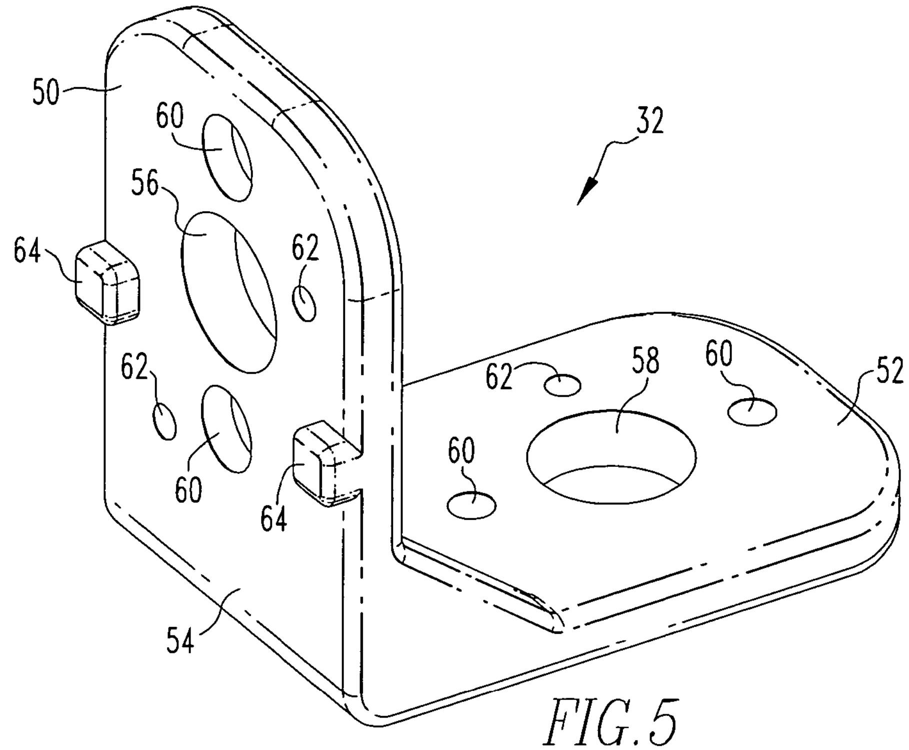
FIG. 5 is an isometric view of a mounting bracket of the present invention, illustrating the mounting bracket in a first orientation.
Figure 6:
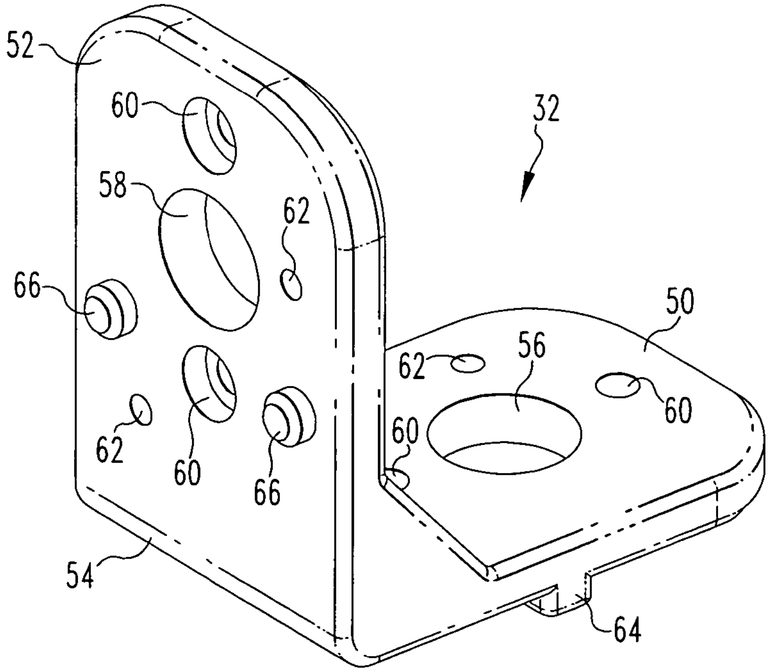
FIG. 6 is an isometric view of a mounting bracket according to the present invention, illustrating the mounting bracket in a second orientation.

Although it may be desirable to use different motors 28 within different motor operators 10, it is desirable to use as many of the same components within different motor operators 10 as possible. For example, a bracket 32 according to the present invention may accommodate two different motors. Referring to FIGS. 5–6, the bracket 32 includes a first flange 50, substantially perpendicular to a second flange 52. A joint or corner 54 separates the first flange 50 and second flange 52. The first flange 50 includes a motor aperture 56, and a second flange 52 includes a motor aperture 58. In many preferred embodiments the motor aperture 56 and motor aperture 58 will be located different distances from the joint 54. In the illustrated example, the motor aperture 58 is further from the joint 54 than the motor aperture 56. Each flange 50, 52 will include at least one, and preferably a pair, of motor screw apertures 60, adapted to permit securing a motor 28 to the appropriate flange 50, 52. Likewise, each flange 50, 52 will also include a pair of bracket mounting apertures 62, dimensioned and configured to permit the use of screws or other fastening hardware to secure the motor bracket 32 to the housing 16. The first flange 50 includes at least one, and preferably a pair, of locator pins 64. Likewise, the second flange 52 includes at least, and more preferably a pair, of locator pins 66. In some preferred embodiments, the locator pins 64 will be a different shape and/or offset from the location of the locator pins 66. Alternatively, the locator pins 64 may, in some preferred embodiments, be located a different distance from the joint 54 than the locator pins 66. In the illustrated example, the locator pins 64 are square, and adjacent to the edge of the first flange 50, while the locator pins 66 are round, and spaced from the edge of the second flange 52.

Figure 7:
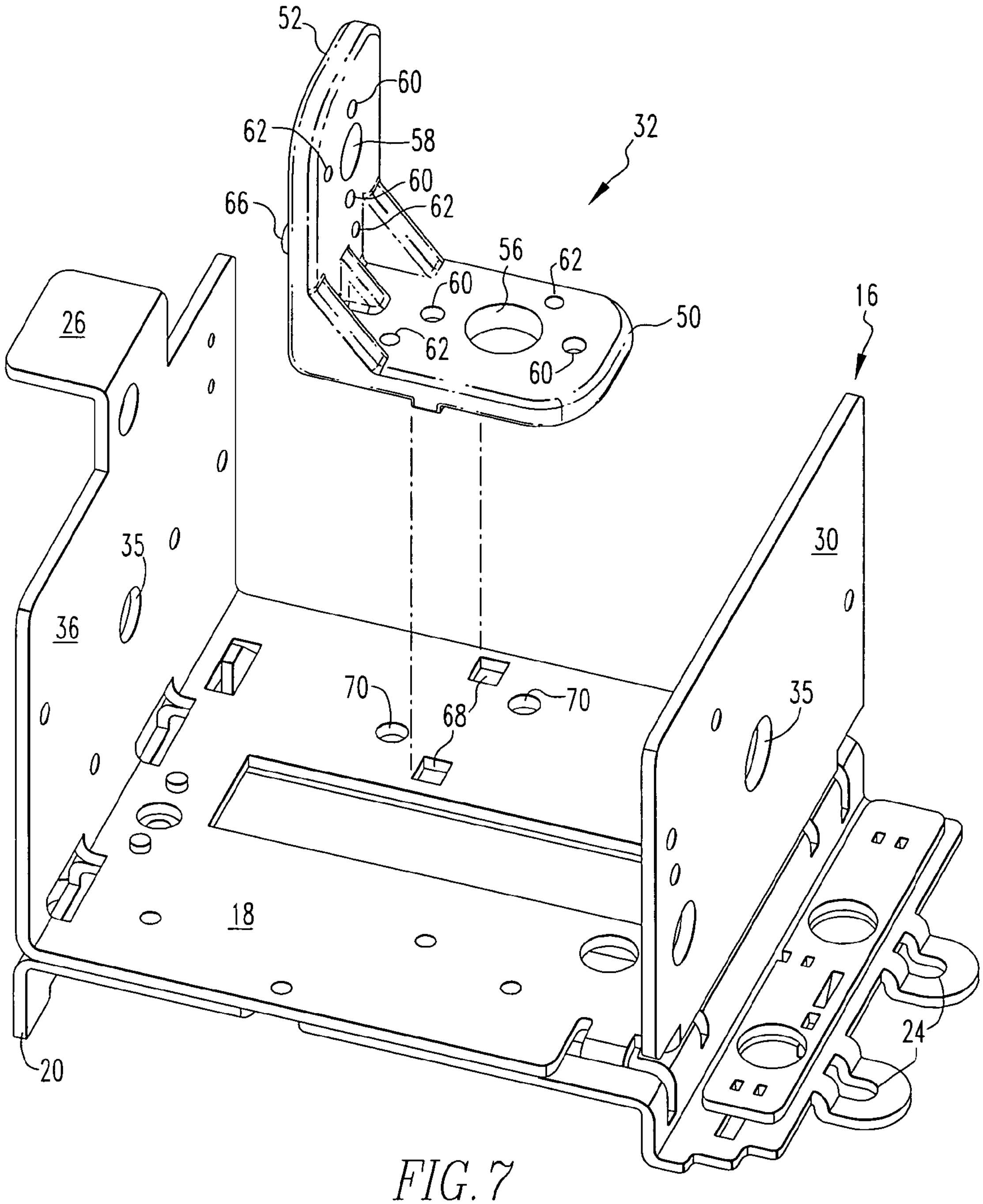
FIG. 7 is a partially exploded view of a housing and motor mounting bracket for a motor operator, illustrating the mounting bracket being installed in the housing in the second orientation of FIG. 6.
Figure 8:
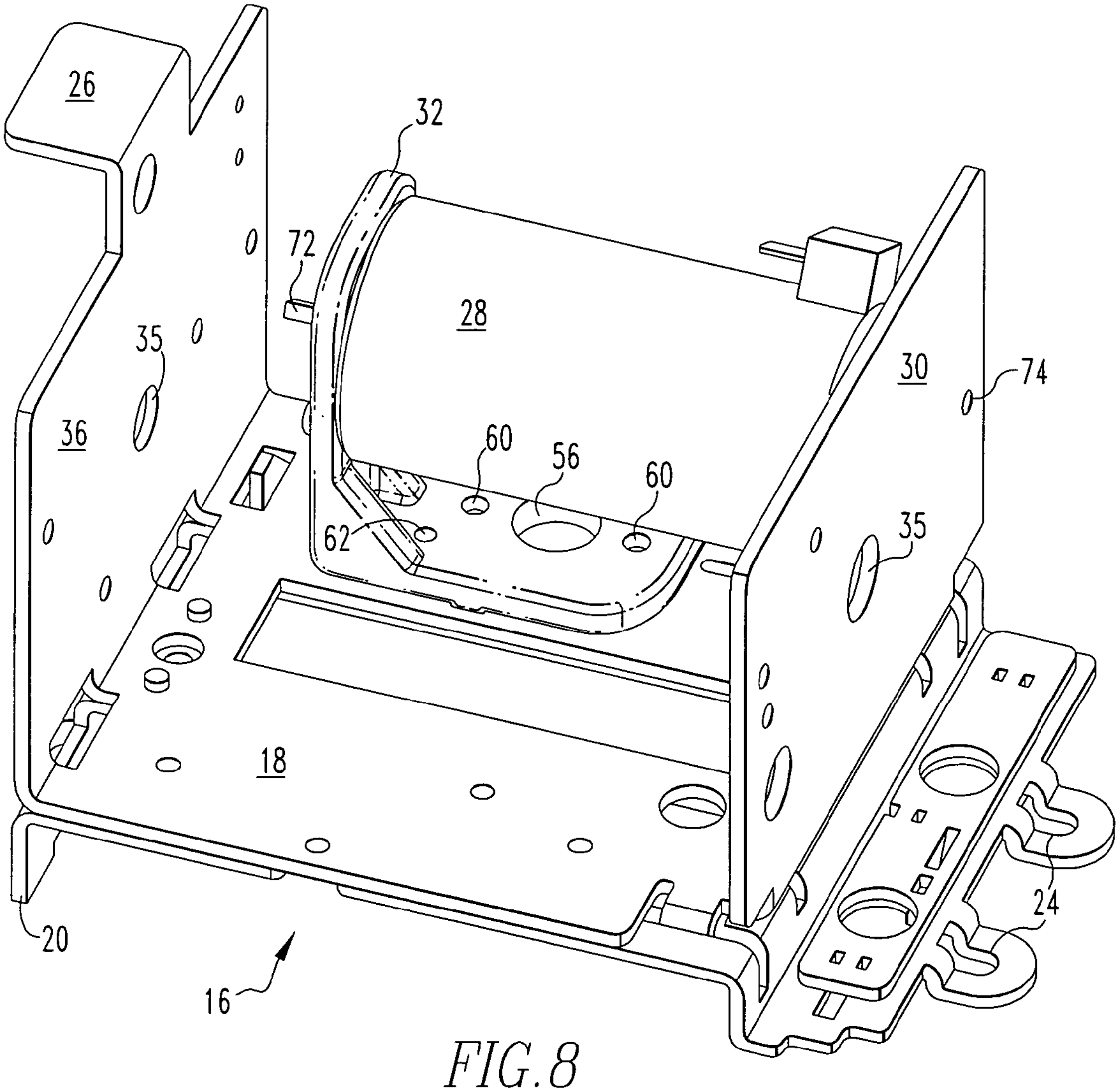
FIG. 8 is an isometric view of a housing, motor, and motor bracket for a motor operator of the present invention, illustrating the bracket being used in its second orientation of FIG. 6.

FIGS. 7–8 illustrate the use of the mounting bracket 32 in the orientation of FIG. 6, with one alternative motor 28. The bracket 32 is first oriented so that the locator pins 64 are properly aligned with the locator pin holes 68 in the housing 16. Next, the motor 28 is secured to the bracket 32 by passing the drive shaft 72 and/or gear through the motor aperture 58, securing the motor 28 therein by passing screws or other mounting hardware through the motor screw apertures 60, and finally placing the locator pins 64 within the locator pin holes 68, and fastening the bracket 32 to the housing 16 through the use of screws passing through both the mounting apertures 62 and the mounting apertures 70 on the housing 16. The opposite end of the motor will then be supported by the housing wall 30, possibly utilizing the motor support aperture 74.

Figure 9:
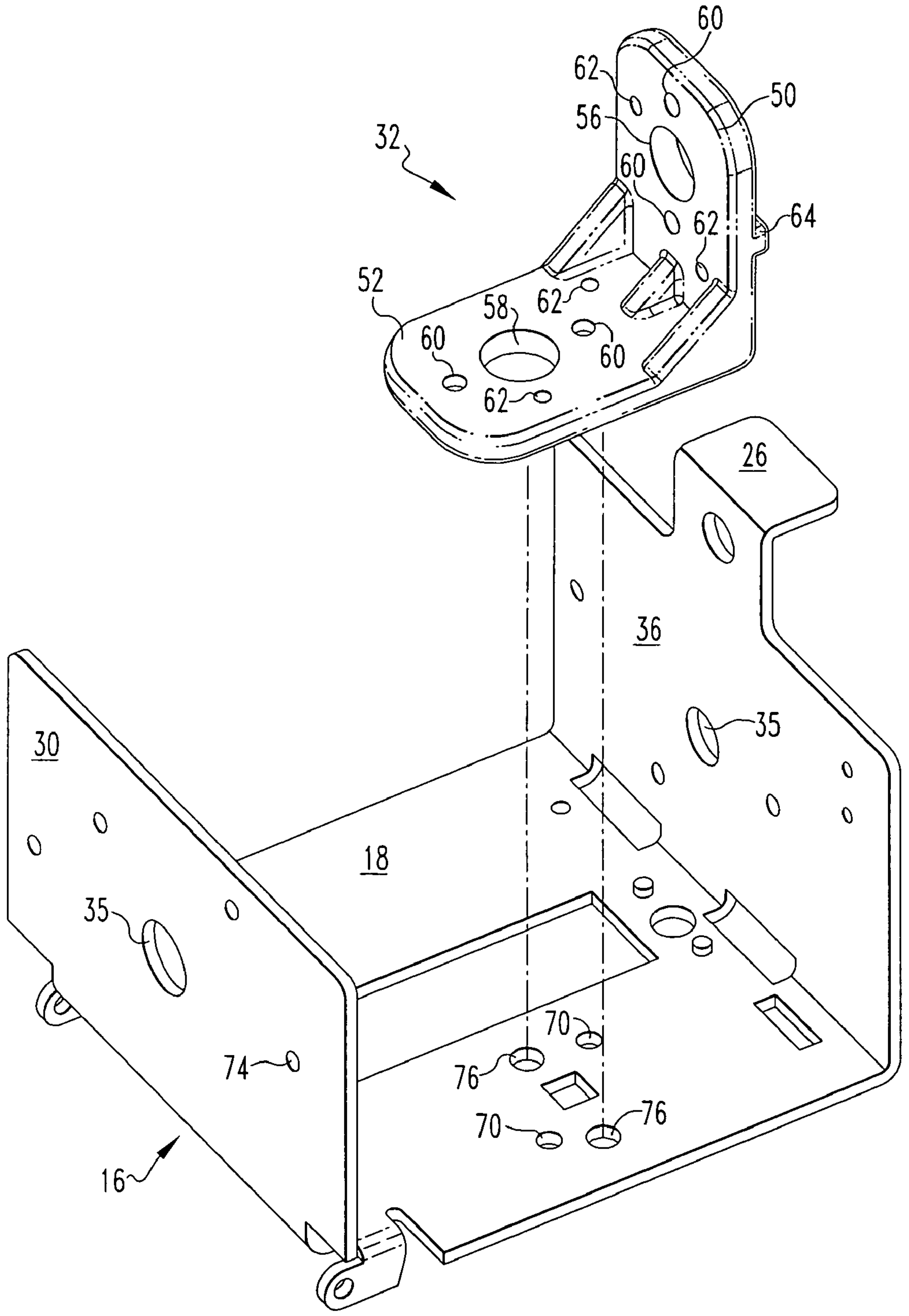
FIG. 9 is an exploded view of a housing and motor mounting bracket for a motor operator according to the present invention, illustrating the mounting bracket being installed in the housing in its first orientation of FIG. 5.
Figure 10:
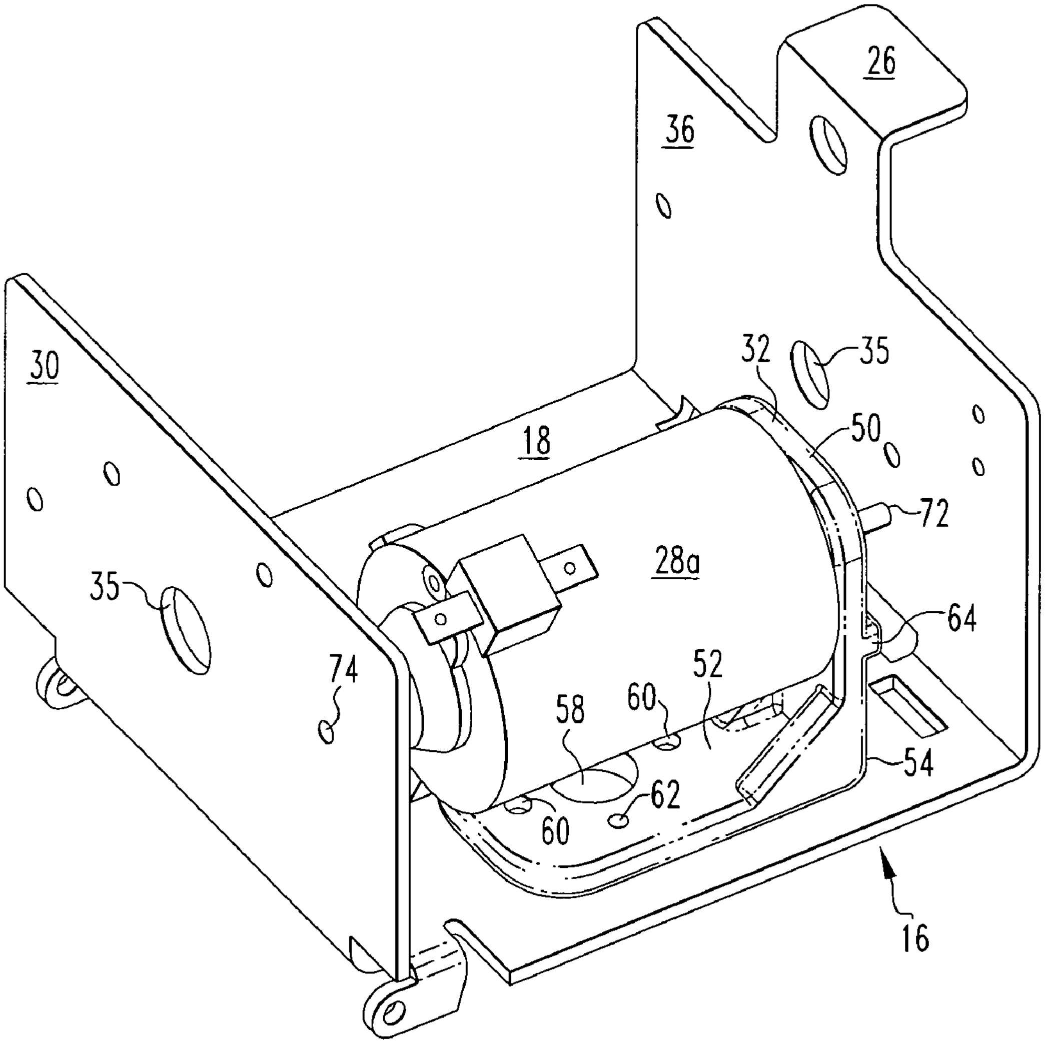
FIG. 10 is an isometric view of a housing, motor, and motor bracket according to the present invention, illustrating the bracket being used in its first orientation of FIG. 5.

Referring to FIGS. 9–10, the bracket 32 is illustrated in the orientation of FIG. 5, so that it may be used with an alternative motor **28*a*. The bracket 32 is first oriented so that the locator pins 66 are aligned with the locator pin apertures 76 within the housing 16. The motor 28*a* is secured to the flange 50, by passing the drive shaft 72 through the aperture 56, and by passing screws or other fasteners through the motor screw apertures 60. The location pins 66 are then placed in the locator pinholes 76, and screws or other fasteners are passed through the mounting apertures 62, and the mounting apertures 70 within the housing 16. The motor is then supported between the bracket 32 and the aperture 74 of the wall 30 of the housing 16**.

Upon reading the above-description, several potential advantages of a bracket 32 of the present invention become apparent. For example, the same bracket may be utilized with motors 28 of different widths or diameters by using a bracket 32 wherein one of the apertures 56, 58 is a greater distance from the joint 54 than the other aperture 56, 58. Alternatively, a bracket 32 may be utilized with motors having different lengths within the same housing by placing the holes 68 corresponding to the locator pins 64 in one location, and placing the holes 76 corresponding to the pins 66 in another location. The proper orientation of the bracket 32 may thereby be keyed to the distance between the bracket 32 and the wall 30. As another alternative, if different motors 28 are utilized with different housings 16, the housing 16 may contain either the locator pin holes 68, or the locator pin holes 76, thereby ensuring that the bracket 32 may be placed within the housing 16 only in the manner appropriate to support the motor 28 used with that particular housing 16. The bracket 32 of the present invention thereby not only provides one bracket 32 that may be utilized with two different motors 28, but also provides a means for ensuring that the motor operator 10 can only be assembled with the bracket 32 in its proper orientation for that application.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A motor operator, comprising:

a motor having a first end and a second end;

a housing including a side wall dimensioned and configured to support said first end of said motor;

a motor bracket dimensioned and configured to support said second end of said motor, comprising:

a first flange;

a second flange substantially perpendicular to said first flange, said second flange having an outside face facing away from said first flange, and an inside face facing towards said first flange;

said first flange having an outside face facing away from said second flange, and an inside flange facing towards said second flange;

a joint between said first and second flanges;

said first flange defining a motor receiving aperture a first distance from said joint;

said second flange defining a motor receiving aperture a second distance from said joint;

said first flange having first means for mounting said mounting bracket within the housing, located a third distance from said joint; and said second flange having second means for mounting said mounting bracket within the housing, located a fourth distance from said joint.

2. The motor operator according to claim 1, wherein said first means for mounting said mounting bracket within said housing include at least one locator pin depending from said outside face of said first flange.

3. The motor operator according to claim 2, wherein said at least one first locator pin is square.

4. The motor operator according to claim 2, wherein said at least one locator pin is round.

5. The motor operator according to claim 1, wherein said second means for mounting said mounting bracket within said housing include at least one locator pin depending from said outside face of said second flange.

6. The motor operator according to claim 5, wherein said at least one locator pin is square.

7. The motor operator according to claim 5, wherein said at least one locator pin is round.

8. The motor operator according to claim 1, wherein said first means for mounting said mounting bracket within said housing includes:

at least one first locator pin depending from said outside surface of said first flange; and wherein said second means for mounting said mounting bracket within said housing includes:

at least one second locator pin depending from said outside surface of said second flange.

9. The motor operator according to claim 8, wherein:

said at least one first locator pin has a first shape; and said at least one second locator pin has a second shape.

10. A mounting bracket for supporting one end of a motor within a motor operator, the motor operator having a housing including at least one side wall supporting the motor's other end, said mounting bracket comprising:

a first flange;

a second flange substantially perpendicular to said first flange, said second flange having an outside face facing away from said first flange, and an inside face facing towards said first flange;

said first flange having an outside face facing away from said second flange, and an inside—face facing towards said second flange;

a joint between said first and second flanges;

said first flange defining a motor receiving aperture a first distance from said joint;

said second flange defining a motor receiving aperture a second distance from said joint;

said first flange having first means for mounting said mounting bracket within the housing, located a third distance from said joint;

said second flange having second means for mounting said mounting bracket within the housing, located a fourth distance from said joint;

wherein said first means for mounting said mounting bracket within said housing include at least one locator pin depending from said outside face of said first flange; and wherein said at least one first locator pin is square.

11. A mounting bracket for supporting one end of a motor within a motor operator, the motor operator having a housing including at least one side wall supporting the motor's other end, said mounting bracket comprising:

a first flange;

a second flange substantially perpendicular to said first flange, said second flange having an outside face facing away from said first flange, and an inside face facing towards said first flange;

said first flange having an outside face facing away from said second flange, and an inside face facing towards said second flange;

a joint between said first and second flanges;

said first flange defining a motor receiving aperture a first distance from said joint;

said second flange defining a motor receiving aperture a second distance from said joint;

said first flange having first means for mounting said mounting bracket within the housing, located a third distance from said joint;

said second flange having second means for mounting said mounting bracket within the housing, located a fourth distance from said joint;

wherein said second means for mounting said mounting bracket within said housing include at least one locator pin depending from said outside face of said second flange; and wherein said at least one locator pin is square.

12. A motor operator, comprising:

a motor having a first end and a second end;

a housing including a side wall dimensioned and configured to support said first end of said motor;

a motor bracket dimensioned and configured to support said second end of said motor, comprising:

a first flange;

a second flange substantially perpendicular to said first flange, said second flange having an outside face facing away from said first flange, and an inside face facing towards said first flange;

said first flange having an outside face facing away from said second flange, and an inside flange facing towards said second flange;

a joint between said fast and second flanges;

said first flange defining a motor receiving aperture a first distance from said joint;

said second flange defining a motor receiving aperture a second distance from said joint;

said first flange having first means for mounting said mounting bracket within the housing, located a third distance from said joint;

said second flange having second means for mounting said mounting bracket within the housing, located a fourth distance from said joint; and wherein a distance between one of said motor receiving apertures and said joint is greater than a distance between said other motor receiving aperture and said joint.

* * * * *